United States Patent [19]

Clikeman et al.

[11] Patent Number: 5,571,415
[45] Date of Patent: Nov. 5, 1996

[54] METHOD FOR PREPARING POROUS POLYMER STRUCTURES

[75] Inventors: Richard R. Clikeman, Washington Crossing; David A. Armbruster, West Chester, both of Pa.

[73] Assignee: Rohm and Haas Company, Philadelphia, Pa.

[21] Appl. No.: 333,173

[22] Filed: Nov. 2, 1994

[51] Int. Cl.$^6$ .................................................. B01D 71/68
[52] U.S. Cl. .................... 210/490; 210/500.41; 264/41
[58] Field of Search ....................... 96/10; 210/500.38, 210/500.41, 500.23, 490; 264/41

[56] References Cited

U.S. PATENT DOCUMENTS

| | | |
|---|---|---|
| 4,247,498 | 1/1981 | Castro . |
| 4,359,256 | 11/1982 | Gallusser et al. . |
| 4,434,250 | 2/1984 | Kessler . |
| 4,517,315 | 5/1985 | Matsumura et al. . |
| 4,519,909 | 5/1985 | Castro . |
| 4,659,470 | 4/1987 | Caneba et al. . |
| 4,673,695 | 6/1987 | Aubert et al. . |
| 4,726,989 | 2/1988 | Mrozinski . |
| 4,859,339 | 8/1989 | Wessling et al. . |
| 4,863,792 | 9/1989 | Mrozinski . |
| 4,867,881 | 9/1989 | Kinzer et al. . |
| 4,957,817 | 8/1990 | Chau et al. . |
| 4,957,943 | 9/1990 | McAllister et al. . |
| 4,980,101 | 12/1990 | Beck et al. . |
| 5,277,811 | 1/1994 | Moya ............................. 210/500.38 X |
| 5,395,570 | 3/1995 | Kopp et al. ................. 264/41 |

FOREIGN PATENT DOCUMENTS 105629  4/1984  European Pat. Off. .

OTHER PUBLICATIONS 6753515 dated Jul. 10, 1985, Canaba et al. (Patent Appln WGI).

*Primary Examiner*—Frank Spear
*Attorney, Agent, or Firm*—Thomas D. Rogerson

[57] ABSTRACT

A process for preparing porous polymer structures by a joining of the techniques of thermally induced phase separation and solvent induced phase separation. The process may be used to form both single and multilayer porous articles.

17 Claims, 1 Drawing Sheet

METHOD FOR PREPARING POROUS POLYMER STRUCTURES

BACKGROUND

Synthetic porous polymer structures display utility in a wide variety of industrial applications. Other uses include use as reverse osmosis membranes, filtration membranes, and insulating materials. The utility of a porous polymer structure for a particular application depends on a number of factors such as the pore size and pore size distribution, strength, and chemical composition of the structure. Porous polymer structures are prepared using a variety of techniques. However, there is still a need for new methods of preparation which will provide structures with unique properties. This invention provides a new method to prepare porous polymer structures and porous articles.

Porous polymer network structures may be characterized as either symmetric (isotropic), or asymmetric (anisotropic). In isotropic structures the pore size remains reasonably constant through the cross section of the structure while in anisotropic structures the pore size varies, usually from small to large, across the structure. Anisotropic structures have certain advantages for some types of applications such as resistance to fouling in membrane filtration. This invention relates to preparation of each structure type.

The two most widely used procedures for the preparation of porous polymer structures are Solvent Induced Phase Separation ("SIPS") and Termally Induced Phase Separation ("TIPS").

One example of SIPS involves dissolving a polymer in a solvent (solvent 1), applying the polymer solution to a smooth, non-porous surface to form a film, and then contacting the film with a second solvent (solvent 2) which is miscible with solvent 1 but does not dissolve the polymer. A solvent gradient is created at the interface where the polymer solution is in contact with solvent 2. This results in rapid polymer precipitation at the interface. As solvent 2 diffuses through the polymer solution, the gradient becomes less abrupt and polymer precipitation slows. Since pore size is generally related to the rate of polymer precipitation, the surface of the structure, where the polymer solution first comes into contact with solvent 2, contains the smallest pores. Pore sizes gradually increase across the remainder of the structure resulting in production of an asymmetric structure. It is very difficult to produce structures with uniform pore size (symmetric or isotropic) and with high strength using this technique.

TIPS relies on differences in polymer solubility in a solvent at high and low temperatures. To understand the process it is useful to refer to FIG. 1.

Figure 1:
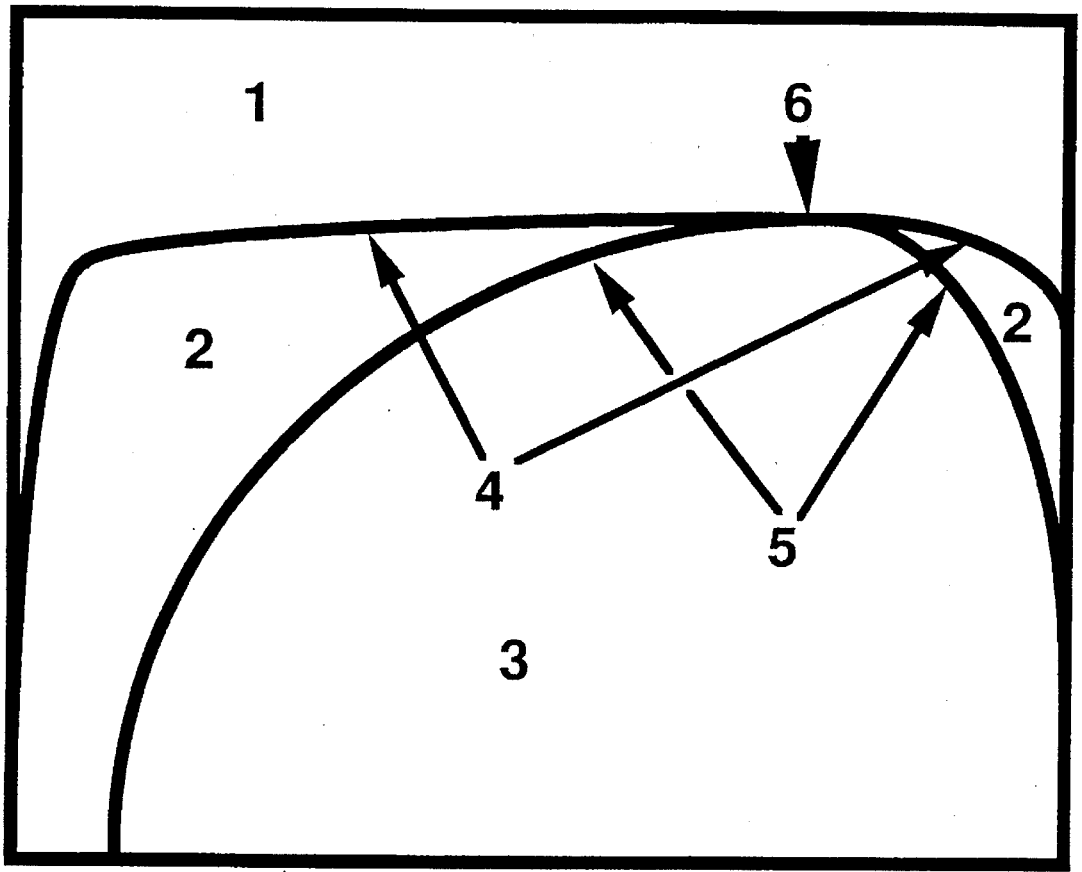
FIG. 1 represents an idealized phase diagram for a typical polymer/solvent pair. The X-axis represents polymer concentration from 0 percent by weight to 100 percent by weight. The Y-axis represents temperature variation from low to high. The diagram is divided into three regions; the stable region (1) where the polymer solvent combination forms a stable solution characterized by a single clear phase; the metastable region (2) where polymer precipitation may occur to produce a nodular structure via a process known as "nucleation and growth"; and the unstable region (3) where polymer precipitation often produces a complex network referred to as a "lacy bicontinuous structure". The boundry between the stable and metastable regions (4) is referred to as the "binodal curve" and the boundry between the metastable and unstable regions (5) is referred to as the "spinodal curve". Occasionally these two boundries may meet such that a composition can pass from the stable region to the unstable region without passing through the metastable region. This intersection point (6) is known as the "critical composition" and occurs at a temperature referred to as the "critical temperature" ($T_c$).

To form a porous structure using TIPS, the polymer is dissolved in the solvent under conditions which place the solution in the stable region. The temperature is then reduced. As the temperature of the polymer solution drops it passes from the stable region into the unstable region through the metastable region, unless the composition is such that it passes through the critical composition. Polymer precipitation in the unstable region is preferred because the lacy bicontinuous structure which often results provides uniformity and strength and also forms a much better filtration medium. When one surface of the initial polymer solution is cooled, a thermal gradient across the polymer solution is produced. The area at or near the cooled surface is cooled quickly producing a fine structure with the smallest pores while the areas farthest from the surface are cooled more slowly producing larger more irregular pores. Therefore, as with SIPS, TIPS may generate asymmetric structures. One disadvantage of TIPS is that as the thickness of the structure produced increases, its strength tends to decrease. Another disadvantage is that heat transfer problems and shrinkage often preclude preparation of porous structures more than 1 mm thick or structures which are uniform across their cross-section. A further disadvantage is that, except at the critical composition, or sometimes at the extreme ends of the polymer solution concentration, the solution passes through the metastable region during cooling. Polymer which precipitates in the metastable region tends to have the undesirable, weak nodular structure resulting from nucleation and growth.

U.S. Pat. No. 4,659,470 describes the use of thermally induced phase separation to form a variety of membranes with different properties. Both isotropic and anisotropic structures of selected porosity are produced depending on the polymer concentration in the solvent and the differential cooling rate.

STATEMENT OF THE INVENTION

This invention involves a method for preparing porous polymer structures by a unique joining of the techniques of TIPS and SIPS. The porous polymer structure is prepared by:

a. forming a solution comprising diphenylsulfone and a polymer selected from polysulfone, polyarylsulfone, and polyphenylene oxide at a temperature from 130° C. to 230° C., preferably from 170° C. to 230° C.;

b. lowering the temperature of the solution below the temperature at which the solution viscosity prevents phase separation of the polymer and the diphenylsulfone, this is usually the temperature below which the solution has a dynamic shear elastic modulus of at least about $10^7$ dynes per $cm^2$; and c. contacting the solution with a solvent mixture comprising acetone and methanol, which induces formation of the porous polymer structure.

A condition of the invention is that during cooling of the polymer solution, and while the solution is still in the stable region (see FIG. 1), the solution viscosity increases to a point that the solution does not phase separate as it continues cooling. This condition can even occur while the solution is in the stable region. When this occurs, the solution can be melt processed or formed into a variety of articles using standard melt processing techniques such as extrusion, injection molding; cutting; and the like. Polymer solutions containing 30–70 weight percent polymer have been found to meet these requirements.

After cooling, introduction of the acetone/methanol solvent mixture causes the already unstable polymer solution to phase separate. If the phase separation occurs in the unstable region, polymer precipitation occurs via spinodal decomposition, resulting in production of a lacy bicontinuous structure. Acetone/methanol solutions which are 10–90 percent by volume acetone have been found to consistently provide such a structure.

This invention provides articles comprising porous polymer structures. Because the homogeneity of the structure can be maintained, this invention also provides compositions comprising lacy bicontinuous structures which are uniform over thicknesses greater than 20 micrometers, such uniformity is not obtained with SIPS or TIPS. This invention also provides multilayer articles comprising porous polymer structures in which each layer has a unique structure. The invention further provides a process for preparation of structures in two stages; formation of an article followed by formation of pores in the article. Furthermore, the invention provides porous structures into which particles are incorporated. In a similar manner, the invention provides porous articles containing voids resulting from incorporation of swellable, extractable particles into the polymer solution from which the structure is prepared followed by removal of the particles by extraction from the structure, as well as structures containing voids around swellable, non-extractable particles.

When the viscosity of the polymer solution is such that it prevents phase separation of the polymer and the diphenylsulfone, the solution can be stored for indefinite time periods prior to formation into an article and exposure to the acetone/methanol solvent mixture. However, in order for the polymer solution to maintain stability, it is preferable that the storage temperature be below the glass transition temperature, $T_g$, of the polymer. When the solution is later exposed to the acetone/methanol solvent mixture, the mixture diffuses through the polymer solution, the polymer separates and the porous polymeric structure with a lacy bicontinuous form is produced.

We have discovered that a porous polymer structure which will maintain structural integrity with use and during preparation is produced when the polymer $T_g$ is greater than the anticipated use temperature of the porous polymer structure and the polymer $T_g$ is greater than the temperature of contact with the acetone/methanol solvent mixture.

These criteria are all met when the dynamic shear elastic modulus, $G'$, of the polymer solution is at least $10^7$ dynes/cm$^2$. However, in those cases when the $G'$ of the solution is less than $10^7$ dynes/cm$^2$, it may be possible to modify the polymer to regain the $G'$ of $10^7$ dynes/cm$^2$ by addition of a sufficient quantity of a different, high molecular weight polymer, such as polystyrene with a molecular weight greater than about 1,000,000 AMU. In many cases, after formation of the porous structure, the high molecular weight polymer can be removed by extraction.

When the $G'$ of the polymer solution is at least $10^7$ dynes/cm$^2$, the polymer solution can act as a thermoplastic and be processed into a variety of articles using standard thermoplastic processing techniques. Such articles are prepared by:

a. forming a solution comprising diphenylsulfone and a polymer selected from polysulfone, polyarylsulfone, and polyphenylene oxide at a temperature of from 130° C. to 230° C., preferably 170° C. to 230° C.;

b. lowering the temperature of the solution below the temperature at which the solution viscosity prevents phase separation of the polymer and the diphenylsulfone;

c. forming a non-porous article; and d. contacting the non-porous article with a solvent mixture comprising acetone and methanol, which induces formation of the porous polymer structure.

The articles include disks, tubes, rods, sheets, films, fibers, containers, foamed articles, and the like. Alternatively, the article can be formed at the same temperature as the polymer solution is formed, provided that the viscosity of the solution is sufficiently high to allow the article to be formed. In these cases, above steps b. and c. are reversed.

Before or during processing, additives may be combined with the polymer solution. Such additives include antioxidants; thermal and light stabilizers; adsorbents; pore forming particles; fillers; catalysts; affinity ligands; controlled release materials; colorants, toners, and color agents or concentrates; blowing or foaming agents; antistatic agents; conductive materials; odor control agents; liquid crystals; and the like.

One result of the ability to process the polymer solution using standard thermoplastic processing techniques is that the dimensions of the article can be easily controlled. Pore size and distribution may then be controlled by adjusting the polymer solution composition and the acetone/methanol solvent mixture composition, as well as the temperature of contact.

This invention includes porous polymer structures which are combined to form more complex articles, as well as the porous articles themselves. For example, films can be laminated together to form multilayer articles such as multilayer membranes or fabrics. The multilayer articles are prepared by:

a. forming at least two separate solutions independently comprising diphenylsulfone and polymers selected from polysulfone, polyarylsulfone, and polyphenylene oxide at temperatures of from 130° C. to 230° C., preferably 170° C. to 230° C.;

b. lowering the temperature of at least one of the solutions below the temperature at which the solution viscosity prevents phase separation of the polymer and the diphenylsulfone;

c. forming a layer of each solution;

d. forming a non-porous article from the layers; and e. contacting the non-porous article with a solvent mixture comprising acetone and methanol, which induces formation of the pores.

Such articles would find utility especially in the chemical or pharmaceutical manufacturing industry. Multilayer membranes or fabrics can be fabricated having different thicknesses for each layer, different additives in each layer (particularly useful when additives are incompatible with each other), layers with different porosities, layers made from different polymers or polymer concentrations, and even layers for gas separations. Each layer may be used to provide a different property to the membrane or fabric as a whole; for example, some layers may determine the overall porosity, others may incorporate ion exchange resins, affinity ligands, or catalysts, while others may impart strength; all depending on the polymer solution combinations, the acetone/methanol solvent mixture composition, and the presence or absence of additives.

The articles can be stored for varying periods prior to treatment with acetone/methanol solvent mixtures. As a result, a number of articles with differing properties can be stored separately and then combined on a custom basis as needed. For example, a multilayer membrane could be fabricated in which the pore size of each layer and the additive content of each layer could be determined just prior to fabrication. Alternately, a single article could be treated with several different acetone/methanol solvent mixtures, under the same or different conditions, to give articles with different properties.

Porous fibers, with or without additives, can be prepared and then woven or laminated into or onto a fabric. When the additive is a chemical absorbent or deactivator, such a fabric is valuable as a component of a protective garment for use in toxic and/or hazardous environments. Such a garment would have the advantage of protecting the wearer while remaining "breathable", that is, allowing body heat and moisture to escape; a distinct improvement over impermeable garments.

Under appropriate conditions of polymer solution and acetone/methanol solvent mixture concentrations, structures can be prepared having a thin skin in which the pores are small enough to separate gasses such as nitrogen from oxygen, or for use in reverse osmosis applications such as sea water desalinization.

Structures which are foam-like can also be produced. These foam-like structures can be used to support particles such as resins, catalysts, specialty absorbents, or other additives. Such a foam-like structure could also act as an insulating material.

EXAMPLES

The following examples and comparative examples illustrate a number of embodiments of the present invention more specifically.

Test Procedures

1. Differential Scanning Calorimetry Procedure ("DSC")—Unless otherwise indicated, the following procedure was used to obtain differential scanning calorimetry data:

a. Equipment: Perkin-Elmer DSC7 with TAS software, 50 μl aluminum pans.

b. Filling sample pans—The sample pan is filled with ground sample, placed in the DSC chamber without a lid and heated at 100° C./min. to a temperature of 170° C. to 190° C., held for 1 minute, then cooled at 200° C./min. to room temperature. The cycle is repeated with additional ground sample until the pan is full (70–90 mg.).

c. Data acquisition—a lid is placed on the pan, the pan is placed in the DSC chamber, and the following temperature program run:
Heat at 15° C./min. to 170° C., hold for 5 min., cool at 200° C./min. to 20° C. above the hold temperature, cool at 80° C./min. to the hold temperature, hold for 15 min., remove the sample from the DSC and rapidly cool with liquid nitrogen, and then allow the sample to warm to room temperature.

2. Sample Preparation for Scanning Electron Micrograph ("SEM") Analysis—Samples were cryofractured by placing each in a beaker of liquid nitrogen, removing after several minutes, and breaking in half. The broken sample was then mounted with carbon paint on aluminum platens and sputter coated with gold to approximately 125 Å. Micrographs were then obtained using a JEOL JSM-840 scanning electron microscope at magnifications of 20×, 500×, and/or 4000×.

Example 1—Polysulfone/Diphenyl Sulfone

Solutions of polysulfone ("PSF" AMOCO UDEL® P-1700) in diphenyl sulfone ("DPS", melting point 127°–129° C.) were prepared by first melting DPS under a nitrogen atmosphere and heating to approximately 200° C. Sufficient PSF was then added gradually to give solutions containing 10, 20, 30, 40, and 50 weight % PSF. Once the PSF was completely dissolved, each solution was poured into an aluminum pan and rapidly cooled with liquid nitrogen. After warming to room temperature, each sample was broken into small (5–10 mm) pieces and then ground to finer granules using a Tekmar A10 analytical mill.

Subsamples of each sample were analyzed by DSC. The analysis used hold temperatures of 90° C., 110° C., 130° C., 150° C., and 170° C. Examination of the DSC graphs showed that they had several common characteristics; a sharp initial peak at 8–10 min. which is the melting endotherm of the sample, stable heat flow while the sample is held at 170° C., a sharp exotherm at the 15 minute point due to rapid sample cooling to the hold temperature, and then stable heat flow during the 15 minute hold.

For those sample compositions which do not become sufficiently viscous to prevent crystallization when the sample is cooled from the Stable Region (FIG. 1) and held in the Metastable Region or the Unstable Region, a crystallization exotherm appears during the hold period. Crystallization exotherms were observed for the following samples:

| Wt % PSF | Temperatures °C. |
| --- | --- |
| 30 | 90 |
| 20 | 90, 110 |
| 10 | 90, 110, 130 |

Each DSC sample was placed in a 30 ml. vial which was then filled with solvent 2 (1:1 by volume acetone:methanol). The samples were shaken overnight in a mechanical shaker, rinsed with methanol, and dried in a vacuum at 50° C. for 3–4 hours.

Scanning electron micrographic analysis of each sample showed that the 40% and 50% samples, as well as the 30% samples with hold temperatures above 90° C., all had typical spinodal decomposition structure. The remaining samples showed modular structures more typical of crystallization processes.

Example 2—(Comparison)
Polysulfone/Benzophenone

Solutions of PSF in benzophenone (melting point 47°–49° C.) were prepared using the method of Example 1 at concentrations of 30, 40, 50, and 60 weight percent PSF.

DSC analysis showed no crystallization exotherms at the hold temperature since it is above the melting point of the benzophenone. However, when cooled to room temperature, the 50 and 60 weight percent samples remained clear while the 30 and 40 weight percent samples were cloudy, indicating possible crystallization.

The samples were treated with the acetone/methanol solution, cryofractured, and analyzed using the Scanning Electron Micrograph. This analysis confirmed that crystallization had occurred with all samples and that the desired lacy bicontinuous structure did not form.

Example 3—Polyarylsulfone/DPS and Polyphenylene Oxide/DPS

Solutions of polyarylsulfone ("PAS", Radel® A-200, Amoco, MW 60,000 AMU) and polyphenylene oxide ("PPO", General Electric, MW 40,000 AMU) in DPS were prepared using the method of Example 1 at 180° C. at concentrations of 40 and 50 weight percent PAS, cooled with liquid nitrogen, and allowed to warm to room temperature. After treatment with 1:1 by volume acetone:methanol, DSC and SEM analysis showed fine lacy bicontinuous structures had been formed.

Example 4—Preparation of Single- and Multi-Layer Porous Membranes

A 45% by weight solution of PSF in DPS was prepared as in Example 1. A Quantity of this material was weighed onto an aluminum foil disk and placed on the bottom platen of a SPECAC Melt Press and Thin Film Maker. A second aluminum foil disk and the top platen were placed on the sample. The platens were separated with a 100µ spacer ring. The platens were then placed in the melt press which had been preheated to 120° C. The melt press pressure was raised to 1 ton. After 1 minute, the pressure was released and the sample, sandwiched between the aluminum foil disks, was removed and quickly cooled to room temperature. Treatment of the sample with 1:1 by volume acetone:methanol for several hours produced a 100µ thick porous membrane disk which by SEM analysis had a fine, lacy bicontinuous structure.

In a similar manner, a 100µ thick porous membrane was prepared from 50% by weight PSF in DPS which also contained 10% crosslinked polystyrene beads. After the treatment with the 1:1 acetone:methanol solution SEM analysis showed that a membrane of fine, lacy bicontinuous structure was produced which contained the polystyrene beads in cavities slightly larger than the beads within the network. (The slightly larger than bead cavities are presumed to be the result of the beads swelling in the presence of DPS and then shrinking when the DPS is removed by the acetone:methanol treatment.)

A multilayer membrane was prepared by peeling the aluminum foil disks from one side of two 100µ single layer membranes and both sides of a 100µ single layer bead containing membrane before treatment of any of the three with the acetone methanol; stacking the layers between the platens, separating the platens with a 250µ spacer ring; placing the platens in the 120° preheated melt press; raising the press pressure to 4 tons; releasing the pressure after 5 minutes, removing the platens, and cooling the multilayer material to room temperature. After treatment with acetone methanol for several hours, SEM analysis showed that a 3 layer membrane was produced in which the middle layer contained the beads, again, in cavities slightly larger than the beads.

We claim:

1. A process for preparing a porous polymer structure, comprising:
    a. forming a solution comprising diphenylsulfone and a polymer selected from the group consisting of polysulfone, polyarylsulfone, and polyphenylene oxide, at a temperature of from 130° C. to 230° C.;
    b. lowering the temperature of the solution below the temperature at which the solution viscosity prevents phase separation of the polymer and the diphenylsulfone; and
    c. inducing formation of the porous polymer structure by contacting the solution with a solvent mixture comprising acetone and methanol.

2. The process of claim 1 wherein the temperature of the solution below which the solution viscosity prevents phase separation is the temperature wherein the solution has a dynamic shear elastic modulus of at least $10^7$ dynes per $cm^2$.

3. The process of claim 2 wherein:
    a. the solution is from 30 to 70 weight percent polymer;
    b. the solution is formed at a temperature of from 170° C. to 230° C.; and
    c. the solvent mixture is from 10% to 90% by volume acetone.

4. The process of claim 2 wherein the solution further comprises a high molecular weight polymer.

5. The process of claim 4 wherein the high molecular weight polymer is polystyrene with a molecular weight greater than 1,000,000 AMU.

6. A process for preparing an article comprising a porous polymer structure, comprising:
    a. forming a solution comprising diphenylsulfone and a polymer selected from the group consisting of polysulfone, polyarylsulfone; and polyphenylene oxide at a temperature of from 130° C. to 230° C.;
    b. lowering the temperature of the solution below the temperature at which the solution viscosity prevents phase separation of the polymer and the diphenylsulfone;
    c. forming a non-porous article; and
    d. contacting the non-porous article with a solvent mixture comprising acetone and methanol.

7. The process of claim 6 wherein the solution further comprises particles.

8. The process of claim 7 wherein the particles comprise an ion exchange resin.

9. The process of claim 6 wherein the solution further comprises a foaming agent.

10. The process of claim 6, wherein;
    the temperature of the solution below which the solution viscosity prevents phase separation is the temperature wherein the solution has a dynamic shear elastic modulus of at least $10^7$ dynes per $cm^2$.

11. A process for preparing an article comprising a porous polymer structure, comprising the steps of:
    a. forming a solution comprising diphenylsulfone and a polymer selected from the group consisting of polysulfone, polyarylsulfone; and polyphenylene oxide at a temperature of from 130° C. to 230° C.;
    b. forming a non-porous article;
    c. lowering the temperature of the solution below the temperature at which the solution viscosity prevents phase separation of the polymer and the diphenylsulfone; and
    d. contacting the non-porous article with a solvent mixture comprising acetone and methanol.

12. The process of claim 11, wherein;
    the temperature of the solution below which the solution viscosity prevents phase separation is the temperature wherein the solution has a dynamic shear elastic modulus of at least $10^7$ dynes per cm$^2$.

13. The article of claim 11 in the form of a membrane.

14. The article of claim 11 in the form of a fiber.

15. A process for preparing a multi-layer porous polymer article comprising the steps of:
   a. forming at least two separate solutions independently comprising diphenylsulfone and a polymer selected from the group consisting of polysulfone, polyarylsulfone; and polyphenylene oxide at temperatures of from 130° C. to 230° C.;
   b. lowering the temperature of at least one of the solutions below the temperature at which the solution viscosity prevents phase separation of the polymer and the diphenylsulfone;
   c. forming a layer of each solution;
   b. forming a non-porous article from the layers; and
   d. contacting the non-porous article with a solvent mixture comprising acetone and methanol.

16. An article prepared by the process of claim 11.

17. An article prepared by the process of claim 15.

* * * * *